United States Patent
Sachdev et al.

(10) Patent No.: US 11,715,999 B2
(45) Date of Patent: Aug. 1, 2023

(54) METHOD OF MAKING A LAMINATED STATOR OF AN AXIAL FLUX MOTOR

(71) Applicant: GM Global Technology Operations LLC, Detroit, MI (US)

(72) Inventors: Anil K. Sachdev, Rochester Hills, MI (US); Chengwu Duan, Shanghai (CN); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 215 days.

(21) Appl. No.: 17/127,158

(22) Filed: Dec. 18, 2020

(65) Prior Publication Data

US 2022/0200417 A1     Jun. 23, 2022

(51) Int. Cl.
*H02K 15/02*     (2006.01)
*H02K 1/12*     (2006.01)

(52) U.S. Cl.
CPC .............. *H02K 15/02* (2013.01); *H02K 1/12* (2013.01)

(58) Field of Classification Search
CPC .......... H02K 15/02; H02K 1/148; H02K 1/12; H02K 1/02; H02K 15/022
See application file for complete search history.

(56) References Cited

U.S. PATENT DOCUMENTS

| | | | | |
|---|---|---|---|---|
| 4,993,290 | A * | 2/1991 | Obradovic | H02K 15/02 29/598 |
| 2014/0265653 | A1* | 9/2014 | Heins | H02K 1/143 310/198 |
| 2015/0171671 | A1* | 6/2015 | Tenhunen | H02K 1/182 310/91 |
| 2017/0237320 | A1* | 8/2017 | Urabe | H02K 1/16 29/596 |
| 2022/0200417 | A1* | 6/2022 | Sachdev | H02K 1/12 |

* cited by examiner

*Primary Examiner* — Minh N Trinh
(74) *Attorney, Agent, or Firm* — Vivacqua Crane PLLC

(57) ABSTRACT

A method to make a stator lamination of an axial flux motor for an automobile vehicle includes: constructing a stator having multiple stator stack members, including: providing a stator lamination with individual ones of the stator stack members; forming the stator lamination from a single lamination sheet of steel defining a sinuous-shaped assembly having multiple bends; compressing the stator lamination; and machining the stator lamination to create a first edge by removing a first portion of the multiple bends and to create a second edge opposite to the first edge by removing a second portion of the multiple bends.

17 Claims, 4 Drawing Sheets

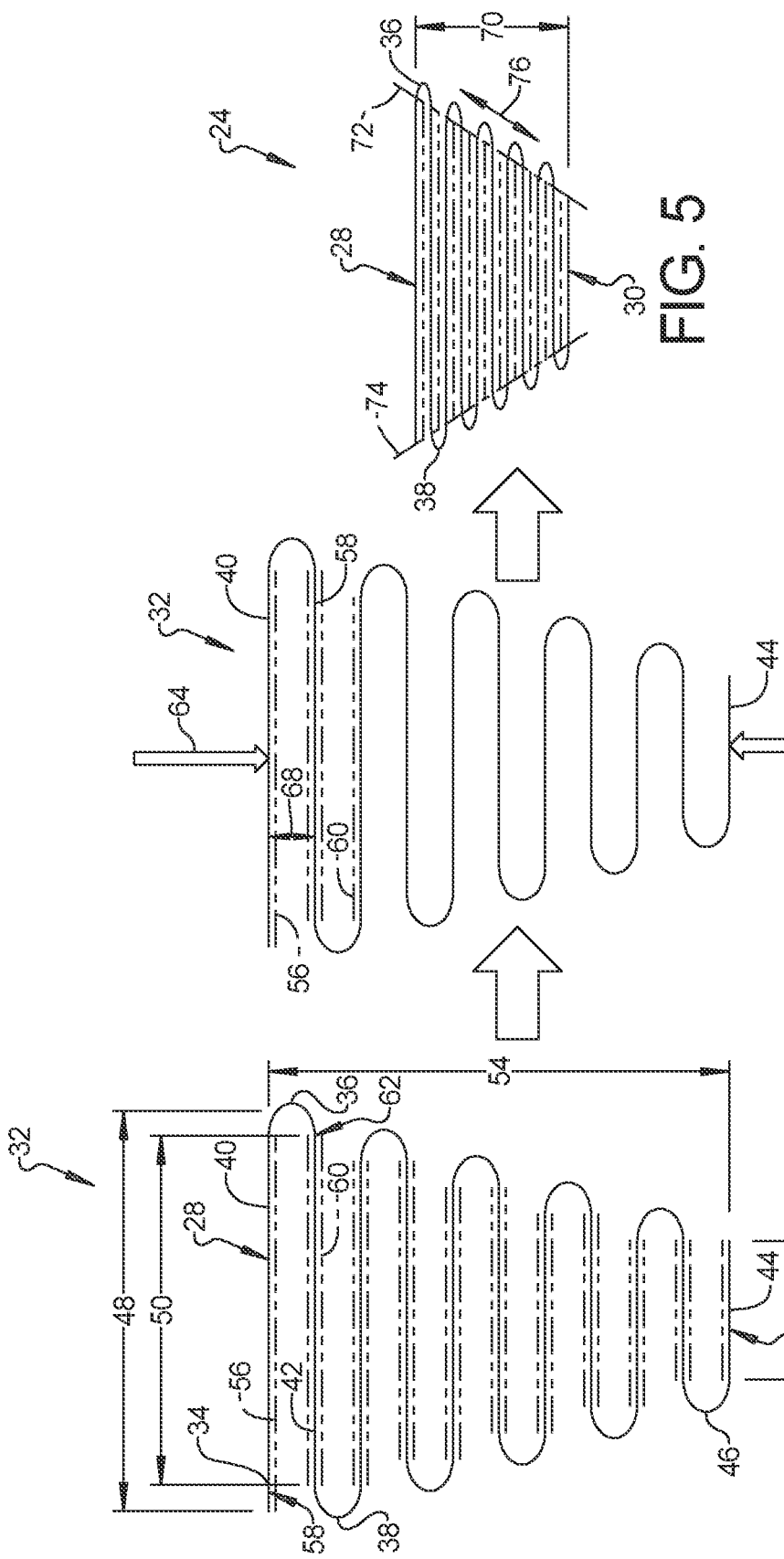

METHOD OF MAKING A LAMINATED STATOR OF AN AXIAL FLUX MOTOR

INTRODUCTION

The present disclosure relates to electrical motors, including axial flux motors and stators used in axial flux motors.

Known electrical motors including axial flux motors include a stator having magnetic material plates forming laminations used to construct the stator. Stator manufacturing is a challenge for an axial flux machine. Known stators for axial flux motors include multiple trapezoidal-shaped stator stacks which are duplicates of each other and are individually made of hundreds of stack plates each having a different width. The stator stacks are dimensionally configured to be positioned in one of multiple individual stack members surrounded by copper wiring which carries electrical current to the stator stacks. Lamination steel is a preferred material for the stack plates but presents significant manufacturing challenges if using conventional stamping or cutting processes due to the multiple different plate widths and dimensions that vary from plate to plate. Soft magnetic composite materials are a potential alternative to lamination steel to reduce manufacturing complexity, but these materials may incur high core losses because of a lower permeability of the soft magnetic composite material compared to lamination steel.

Thus, while current electrical motor stator designs achieve their intended purpose, there is a need for a new and improved system and method for manufacturing laminated stators for axial flux motors.

SUMMARY

According to several aspects, a method to make a stator lamination of a motor for an automobile includes: constructing a stator having multiple stator stack members, including: providing a stator lamination with individual ones of the stator stack members; forming the stator lamination from a single lamination sheet defining a sinuous-shaped assembly of a steel material having optimized grain-orientation with a predetermined ductility and a predetermined brittleness; and compressing the stator lamination.

In another aspect of the present disclosure, the method further includes forming the stator laminations having multiple successive bends.

In another aspect of the present disclosure, the method further includes forming the multiple successive bends as 180-degree bends which after a first one of the multiple successive bends are oppositely facing from a previous one of the multiple successive bends.

In another aspect of the present disclosure, the method further includes providing multiple flat segments of the lamination sheet including transitioning a flat first segment of the lamination sheet into a flat second segment using the first one of the multiple successive bends, and forming subsequent flat segments repeating in succession until a flat final segment is reached via a final bend of the multiple successive bends.

In another aspect of the present disclosure, the method further includes creating a trapezoidal shape of the stator lamination by successively reducing a length of subsequent ones of the multiple flat segments from the first segment to the final segment.

In another aspect of the present disclosure, the method further includes pre-applying a first adhesive layer to a first face of the lamination sheet and a second adhesive layer to a second face of the lamination sheet which is oppositely facing with respect to the first face.

In another aspect of the present disclosure, wherein the compressing the stator lamination step includes application of a first force and a second force oppositely directed with respect to the first force, the first force and the second force reducing clearance gaps between first and second portions of the sinuous-shaped assembly, the first adhesive layer applied over the first portions of the sinuous-shaped assembly coming into direct contact, and the second adhesive layer applied over the second portions of the sinuous-shaped assembly coming into direct contact.

In another aspect of the present disclosure, the method further includes forming the lamination sheet from a silicon containing steel defining up to a Fe 7.0% Si steel.

In another aspect of the present disclosure, the method further includes: enclosing the stator stack members in a stator winding; sizing the stator stack members to fill a trapezoidal-shaped cavity defined by the stator winding; and rotating a motor shaft of an axial flux motor by energizing the stator winding.

In another aspect of the present disclosure, the method further includes forming the stator lamination having a trapezoidal shape with an outwardly directed first end facing away from the motor shaft in an installed position of the stator lamination within the stator and an inwardly directed second end facing toward the motor shaft in an installed position of the stator lamination within the stator.

According to several aspects, a method to make a stator lamination of an axial flux motor for an automobile vehicle includes: constructing a stator having multiple stator stack members, including: providing a stator lamination with individual ones of the stator stack members; forming the stator lamination from a single lamination sheet of steel defining a sinuous-shaped assembly having multiple bends; compressing the stator lamination; and machining the stator lamination to create a first edge by removing a first portion of the multiple bends and to create a second edge opposite to the first edge by removing a second portion of the multiple bends.

In another aspect of the present disclosure, the method further includes pre-applying a first adhesive layer to a first face of the lamination sheet and a second adhesive layer to a second face of the lamination sheet which is oppositely facing with respect to the first face prior to the forming step.

In another aspect of the present disclosure, the method further includes applying heat to activate the first adhesive layer and the second adhesive layer.

In another aspect of the present disclosure, the method further includes performing the machining in a first direction parallel to the first edge and in a second direction parallel to the second edge.

In another aspect of the present disclosure, the method further includes performing the machining in a direction perpendicular to a first direction parallel to the first edge and perpendicular to a second direction parallel to the second edge.

In another aspect of the present disclosure, the method further includes directing a laser beam at the lamination sheet bend location before or during formation of the bends to soften the lamination sheet prior to bending.

In another aspect of the present disclosure, the method further includes: positioning a stator winding within the axial flux motor, the stator winding having a trapezoidal-shaped cavity; and shaping a first segment and a final segment of the stator lamination to fit within the trapezoidal-shaped cavity of the stator winding.

According to several aspects, a stator lamination of an axial flux motor includes multiple stator stack members including: a stator lamination provided with individual ones of the stator stack members. Each stator lamination has a single lamination sheet of steel defining a sinuous-shaped assembly having multiple bends. Multiple segments of the stator lamination are individually positioned between successive ones of the multiple bends. A spacing between successive ones of the multiple segments is minimized by compressing the sinuous-shaped assembly. A first edge of the stator lamination is formed after removal of a first portion of the multiple bends and a second edge opposite to the first edge is formed by removal of a second portion of the multiple bends.

In another aspect of the present disclosure, a first segment length of a first one of the multiple segments is greater than a second segment length of a second one of the multiple segments and each successive segment of the multiple segments is reduced in length to a final segment having a final segment length shorter than any preceding one of the multiple segments.

In another aspect of the present disclosure, a scribe created in the stator lamination at locations of individual ones of the multiple bends, the scribe inducing fracture during subsequent bending of the lamination sheet.

In another aspect of the present disclosure, a series of perforations are created in the stator lamination at locations of individual ones of the multiple bends, the perforations inducing fracture during subsequent bending of the lamination sheet.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a front elevational view of a stator stack member having a sinuous single plate including successive bends for use in a stator stack member similar to FIG. 2 during an initial formation step;

FIG. 4 is a front elevational view of the stator stack member of FIG. 3 during a compression step;

FIG. 5 is a front elevational view of the stator stack member of FIG. 4 after stack member compression;

DETAILED DESCRIPTION

The following description is merely exemplary in nature and is not intended to limit the present disclosure, application, or uses.

Figure 1:
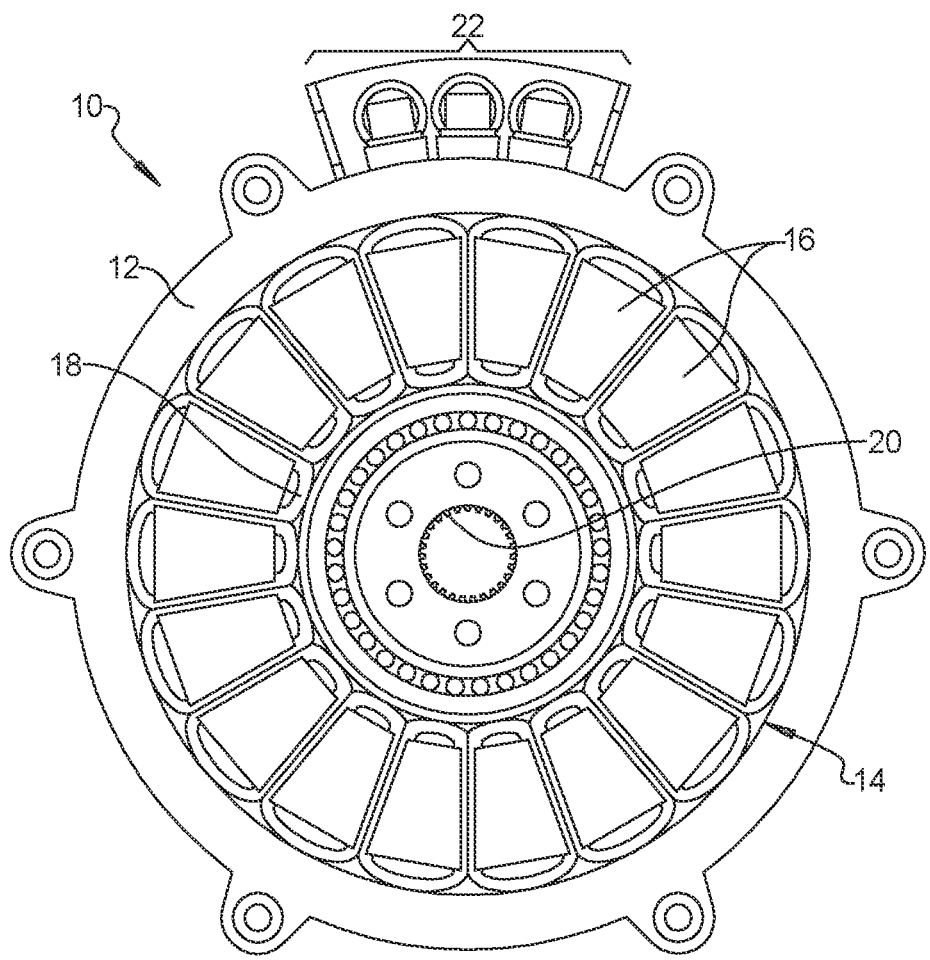
FIG. 1 is a front right perspective view of an axial flux motor according to an exemplary aspect.

Referring to FIG. 1, a laminated stator and method to make a laminated stator of an axial flux motor 10 are used to form an electrical motor 12 for automobile vehicles having a stator 14 formed of multiple individual stator stack members 16 individually having a trapezoidal shape. A stator winding 18 made generally of a copper wire extends about an outer perimeter of the individual stator stack members 16 to deliver electrical current to the individual stator stack members 16 of the stator 14 for inducing axial rotation of a motor shaft 20. Electrical power such as a three-phase electrical current may be provided to the stator winding 18 through a power connection 22.

Referring to FIG. 2 and again to FIG. 1, an exemplary individual stator stack member 16 is presented which is representative of all of the stator stack members 16 of the stator 14, therefore the following discussion applies equally to the multiple stator stack members 16 of the stator 14. Individual stator stack members 16 include a stator lamination 24 made of a lamination steel plate including but not limited to a silicon containing steel defining up to a Fe 7.0% Si steel which is sized to fill a trapezoidal-shaped cavity 26 defined by the stator winding 18 in an area of each of the stator stack members 16. By filling the trapezoidal-shaped cavity 26 an optimum flux may be generated by the stator stack members 16, maximizing a power output of the electrical motor 12. The stator lamination 24 is therefore formed having a trapezoidal shape with an outwardly directed first end 28 facing away from the motor shaft 20 in an installed position within the stator 14 and an inwardly directed second end 30 facing toward the motor shaft 20 in an installed position within the stator 14. According to several aspects, dimensions of the stator lamination 24 are predetermined to fill the trapezoidal-shaped cavity 26.

Figure 2:
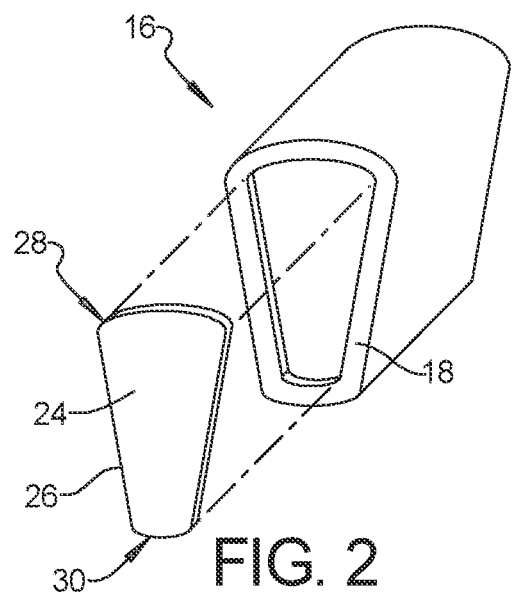
FIG. 2 is a front left perspective view of a stator stack member of the axial flux motor of FIG. 1.

Referring to FIG. 3 and again to FIG. 2, an exemplary one of the stator laminations 24 is formed by initially creating a sinuous assembly 32 using a lamination steel plate also defining a single lamination sheet 34 having multiple successive bends such as a 180-degree first bend 36 and a 180-degree second bend 38. A flat first segment 40 of the single lamination sheet 34 transitions into a flat second segment 42 using the first bend 36, and subsequent flat segments repeat in succession until a flat final segment 44 is reached via a 180-degree final bend 46. "Flat" as referred to herein is defined as a planar-shape throughout a predetermined surface area. According to several aspects the trapezoidal shape of the stator laminations 24 is created by successively reducing a length of subsequent ones of the flat segments. For example, a first segment length 48 of the first segment 40 is greater than a second segment length 50 of the second segment 42 and each successive one of the segments is reduced in length until the final segment 44 which has a final segment length 52 shorter than any of the preceding segments. A total height 54 of the sinuous assembly 32, together with the first segment length 48 and the final segment length 52 are predetermined based on a predetermined geometry and space envelope of the trapezoidal-shaped cavity 26.

The single lamination sheet 34 of an appropriate lamination steel such as a silicon containing steel defining up to a Fe 7.0% Si steel is wrapped with a sequentially decreasing width per wrap to create a rough trapezoid-shape. The initial wrapping does not fracture the single lamination sheet 34 until a bend radius of approximately 135° is reached, which can be in an elastic state. Fracture can occur when the stack is subsequently pressed as described in reference to FIG. 4. According to several aspects, a laser beam may be directed at the lamination sheet 34 proximate to a bend location before or during formation of the bends to soften the lamination sheet 34 prior to or during bending.

According to several aspects to fix successive ones of the flat segments of the stator lamination 24, a first adhesive layer 56 is pre-applied to a first portion defining a first face 58 of the lamination sheet 34 and a second adhesive layer 60 is pre-applied to a second portion defining a second face 62 of the single lamination sheet 34 which is oppositely facing with respect to the first face 58. The function of the first adhesive layer 56 and the second adhesive layer 60 will be described in greater detail in reference to FIG. 5. According to further aspects, the adhesive layers can be modified to include the first adhesive layer 56 and the second adhesive layer in alternating arrangement prior to bending the lamination sheet 34. By alternating the adhesive layers, when the stator lamination 24 is subsequently compressed after bending each individual flat segment adhesively binds to a successive one of the flat segments with one of the adhesive layers only applied to one of the segment faces.

Referring to FIG. 4 and again to FIGS. 2 and 3, after formation the sinuous assembly 32 is compressed using a first force 64 acting directly against the first segment 40 and applying a reaction force or a second force 66 equal and oppositely directed with respect to the first force 64 acting directly against the final segment 44. Application of the first force 64 and the second force 66 reduces a clearance gap between successive ones of the segments to substantially a zero clearance, for example reducing a clearance gap 68 between the first segment 40 and the second segment 42. By eliminating the clearance gaps between successive segments, the first adhesive layer 56 applied over individual segments come into direct contact with each other, and the second adhesive layer 60 applied over individual segments also come into direct contact with each other allowing the segments to fixedly connect or bond to each other.

Referring to FIG. 5 and again to FIGS. 1 through 4, the sinuous assembly 32 of FIG. 4 is shown after compression using the first force 64 and the second force 66. The adhesive including the first adhesive layer 56 and the second adhesive layer 60 on the single lamination sheet 34 is activated during the pressing operation either by the application of pressure or by the application of heat, or both, to firmly hold the laminated segments together. A total height 70 is fixed by the pressing operation and may be modified by machining the first end 28 or the second end 30. The adhesively bonded segments defining the stator lamination 24 are then machined, ground or etched to fit snugly within the stator opening trapezoidal-shaped cavity 26. Machining may be performed to create a first edge 72, removing the bends such as the first bend 36 and to create an opposite second edge 74 by removing the oppositely located bends such as the second bend 38. The machining may be in a direction parallel to individual edges, such as in a direction 76, or the machining may be performed in a direction into or out of the sheet as viewed in FIG. 5 to mitigate against deforming material in a direction causing the individual segments to deflect toward other segments.

Figure 6:
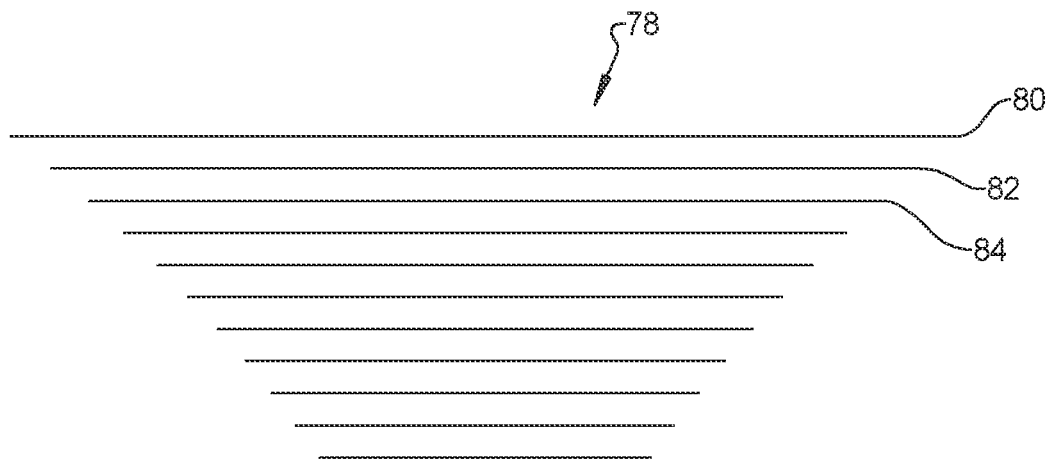
FIG. 6 is a front elevational view of a prior art stator stack member.

Referring to FIG. 6 and again to FIG. 5, in a known stator stack member 78 multiple individual plates such as a first plate 80, a second plate 82 and a third plate 84 are separately cut or machined to different lengths. The plates are then stacked to form the trapezoidal-shaped stator stack member 78. This process is labor intensive due to the need to dimensionally control the plates, to number or save individual plates and to retrieve and stack the plates accurately to achieve the trapezoidal shape.

Figure 7:
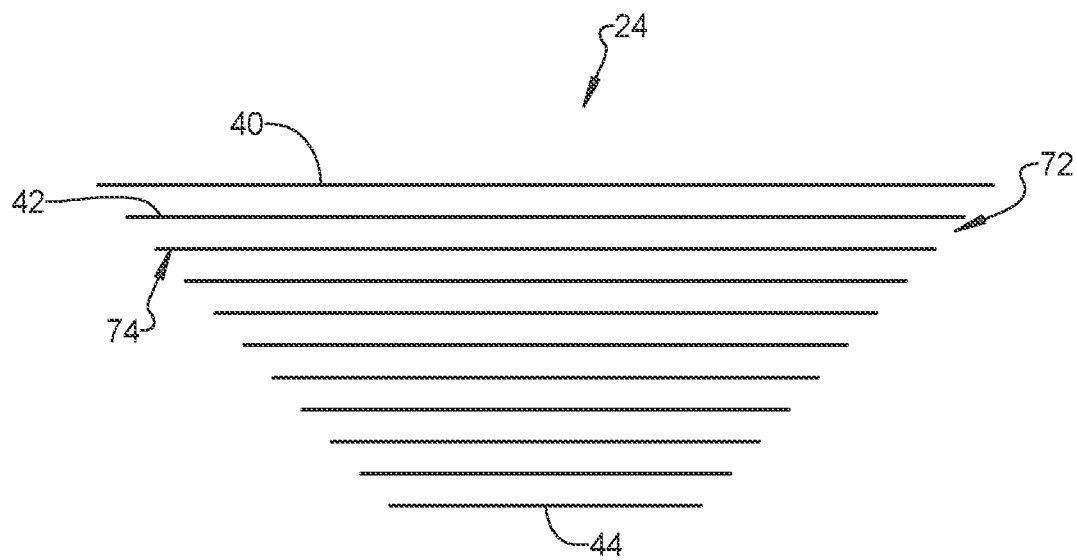
FIG. 7 is a front elevational view of a completed stator stack member of the present disclosure prior to installation into a stator assembly.

Referring to FIG. 7 and again to FIGS. 1 through 5, according to the present disclosure the machining performed such as to create the first edge 72 and the second edge 74 allows one or both of the first segment 40 and the final segment 44 of the stator lamination 24 of the present disclosure to be modified to specifically fit within the trapezoidal-shaped cavity 26 described in reference to FIG. 2.

Referring to FIG. 8 and again to FIGS. 1 through 5, according to other aspects, multiple deformations which according to several aspects define shallow slits 86, 88, 90, 92 are created on a surface 94 of the lamination sheets 34 such that during a subsequent bending process, the lamination sheets 34 break or fracture at the location of the slits 86, 88, 90, 92, thereby eliminating the need for post machining or laser cutting of the stator lamination 24 as shown and described in reference to FIG. 5. This process is effective for forming electrical steels having limited ductility including certain silicon containing steels. The slits 86, 88, 90, 92 are positioned on the surface 94 of the lamination sheet 34, extend across the entire surface 94 and are spaced horizontally along the lamination sheet 34 to define sections of differing lengths. For example, the sections range from a maximum length section 96 to a minimum length section 98.

Figure 8:
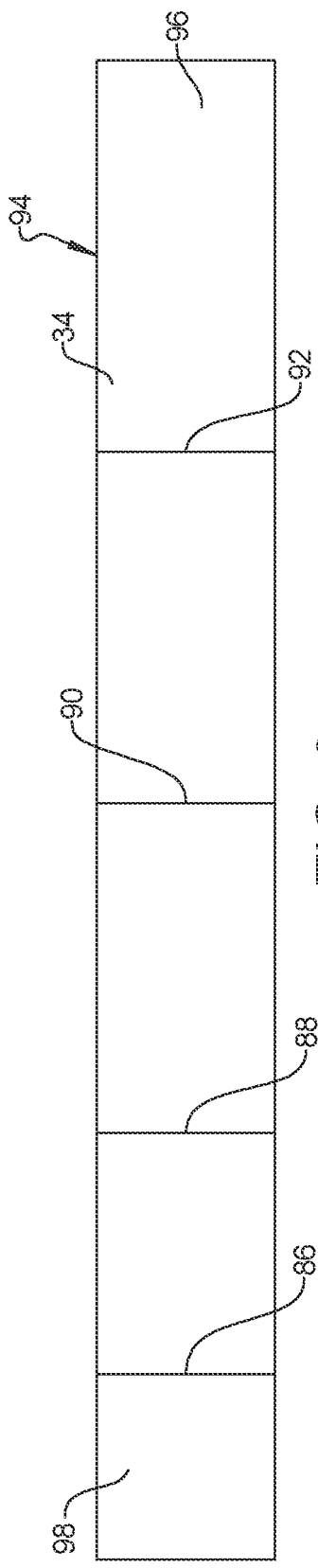
FIG. 8 is a top plan view of a single lamination sheet including multiple slits provided as fracture locations.

Referring to FIG. 9 and again to FIG. 8, the slits 86, 88, 90, 92 extend away from the surface 94 to a predetermined depth defining a portion of a total thickness of the lamination sheet 34. The slits 86, 88, 90, 92 do not extend for the total thickness of the lamination sheets 34 allowing subsequent fracture of the lamination sheet 34 by application of a bending force at the slits 86, 88, 90, 92.

Figure 9:
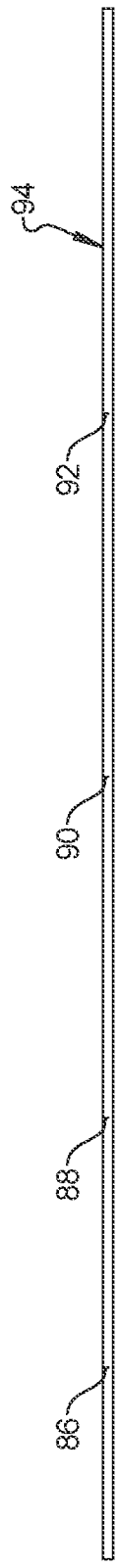
FIG. 9 is a side elevational view of the single lamination sheet of FIG. 9.
Figure 10:
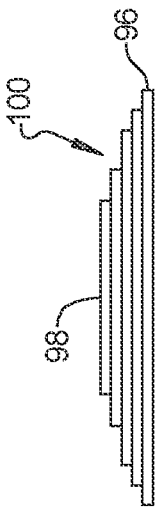
FIG. 10 is an end elevational view of a stacked laminated stator of the present disclosure.

Referring to FIG. 10 and again to FIGS. 8 and 9. the slits 86, 88, 90, 92 may be spaced on the lamination sheet 34 to provide different length sections. After fracture, the sections are configured to form the trapezoidal shape of a stator lamination 100, which is similar to the stator lamination 24 when stacked.

As a further alternative to the above processes of forming the bends, the multiple deformations according to several aspects individually define a fine scribe similar in configuration to the slits 86, 88, 90, 92 identified above may be made at bend locations such as at a center of the first bend 36 and the second bend 38. The one or more scribes induce fracture during subsequent folding of the single lamination sheet 34. In this method the failure location is predetermined by the scribe location and is therefore not stochastic.

As a further alternative to the above processes of forming the multiple deformations, the continuous length slits 86, 88, 90, 92 may be replaced with linear rows of perforations which may extend partially through or totally through the thickness of the lamination sheet 34.

According to further aspects, in addition to applying pressure to the adhesives noted above with respect to FIG. 3, including the first adhesive layer 56 and the second adhesive layer 60, alternate bonding methods including light activation, induction activation or ultrasonic activation may also be used.

A laminated stator and method to make a laminated stator of an axial flux motor 10 of the present disclosure offers several advantages. These include a continuous method to make layered laminates that are optimally oriented and suffer minimal loss. Optimized grain-oriented materials are used that suit the manufacturing method with proper ductility and brittleness. The present method simplifies lamination for steel stator manufacturing and is enabled by use of the optimized grain-oriented materials having predetermined ductility and brittleness.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to make a stator lamination of a motor for an automobile vehicle, comprising:
    constructing a stator having multiple stator stack members, including:
        providing a stator lamination with individual ones of the stator stack members;
        forming the stator lamination from a single lamination sheet defining a sinuous-shaped assembly of a steel having optimized grain-orientation with a predetermined ductility and a predetermined brittleness, wherein the sinuous shaped assembly includes multiple segments and each successive one of the multiple segments has a reduced length relative to a preceding segment; and
        compressing the stator lamination based on the defined sinuous shaped assembly of the steel and the optimized grain-orientation with the predetermined ductility and the predetermined brittleness.

2. The method of claim 1, further including forming the stator lamination having multiple successive bends, each of the multiple successive bends disposed between one of the multiple segments.

3. The method of claim 2, further including forming the multiple successive bends as 180-degree bends which after a first one of the multiple successive bends are oppositely facing from a previous one of the multiple successive bends.

4. The method of claim 3, wherein the multiple segments are comprised of multiple flat segments of the single lamination sheet and including transitioning a flat first segment of the lamination sheet into a flat second segment using the first one of the multiple successive bends, and forming subsequent flat segments repeating in succession until a flat final segment is reached via a final bend of the multiple successive bends.

5. The method of claim 4, further including creating a trapezoidal shape of the stator lamination.

6. The method of claim 1, further including pre-applying a first adhesive layer to a first face of the single lamination sheet and a second adhesive layer to a second face of the single lamination sheet which is oppositely facing with respect to the first face.

7. The method of claim 6, wherein the compressing the stator lamination includes application of a first force and a second force oppositely directed with respect to the first force, the first force and the second force reducing clearance gaps between first and second portions of the sinuous-shaped assembly, the first portions of the sinuous-shaped assembly having individual ones of the first adhesive layer in direct contact with other individual ones of the first adhesive layer, and the second portions of the sinuous-shaped assembly having individual ones of the second adhesive layer in direct contact with other individual ones of the second adhesive layer.

8. The method of claim 1, further including forming the single lamination sheet from a silicon containing steel defining up to a Fe 7.0% Si steel.

9. The method of claim 1, further including:
    sizing the stator stack members to fill a trapezoidal-shaped cavity defined by a stator winding;
    enclosing the stator stack members in the stator winding; and
    rotating a motor shaft of an axial flux motor by energizing the stator winding.

10. The method of claim 9, further including forming the stator lamination having a trapezoidal shape with an outwardly directed first end facing away from the motor shaft in an installed position of the stator lamination within the stator and an inwardly directed second end facing toward the motor shaft in an installed position of the stator lamination within the stator.

11. The method of claim 1, the method further comprising:
    creating multiple deformations in the single lamination sheet; and
    bending the single lamination sheet to fracture the single lamination sheet at individual ones of the multiple deformations to create multiple sections to form the stator lamination from the single lamination sheet.

12. The method of claim 11, further including:
    pre-applying a first adhesive layer to a first face of the single lamination sheet and a second adhesive layer to a second face of the single lamination sheet which is oppositely facing with respect to the first face prior to forming the stator lamination.

13. The method of claim 12, wherein the multiple deformations include slits created across a face of the single lamination sheet having a depth defining a predetermined percentage of a thickness of the single lamination sheet.

14. The method of claim 12, further including machining the stator lamination to create a first edge by removing a first portion of the multiple bends and to create a second edge opposite to the first edge by removing a second portion of the multiple bends.

15. The method of claim 14, further including performing the machining in a direction perpendicular to a first direction parallel to the first edge and perpendicular to a second direction parallel to the second edge.

16. The method of claim 12, further including directing a laser beam at a bend location of the single lamination sheet before or during formation of the multiple bends to soften the single lamination sheet prior to bending.

17. The method of claim 11, further including:
    positioning a stator winding within the motor for the automobile vehicle, the stator winding having a trapezoidal-shaped cavity; and
    shaping the multiple segments of the stator lamination to fit within the trapezoidal-shaped cavity of the stator winding.

* * * * *